July 15, 1952   S. L. SIMPSON   2,603,267
RESILIENT WHEEL
Filed Nov. 15, 1949

INVENTOR.
Selden L. Simpson.
BY Stanley Lightfoot
Attorney

Patented July 15, 1952

2,603,267

UNITED STATES PATENT OFFICE 2,603,267

RESILIENT WHEEL

Selden L. Simpson, Brighton, Mich.

Application November 15, 1949, Serial No. 127,378

2 Claims. (Cl. 152—7)

This invention relates to a resilient wheel member which may be the major portion of a wheel, as in the case of a wheelbarrow wheel, or may be in the form of a tire mounted on the felloe of a wheel, as in truck or tractor wheels, and has for its object to provide for simplicity of construction and strength with a requisite degree of resilience arrived at in a manner which provides for the distribution of stress and flection in the wheel member under conditions of operation in a highly efficient and practical manner.

More particularly it is an object of the said invention to provide a resilient wheel member of the type referred to which may be produced as an integrated structure, as by simple molding operations, characterized by a medial flexible wall flanked by flexible spokes resulting from the formation of a circular series of recesses in opposite faces of said member, the outer ends of the said spokes merging in a substantially tangential manner into the outer peripheral portion of the member and the inner ends of the spokes radiating substantially from the inner annular portion of the member.

A further object of the said invention is to provide a resilient wheel member of the type referred to having on opposite faces thereof arcuate spoke formations the outer ends of which merge in a substantially tangential manner into the outer peripheral portion of the member characterized by the spokes on one side of the member being rotationally staggered in relation to the spokes on the opposite side thereof.

Still further objects or advantages additional or subsidiary to the aforesaid objects, or resulting from the construction or operation of the invention as it may be carried into effect, will become apparent as the said invention is hereinafter further disclosed.

In carrying the said invention into effect I may adopt the novel construction of resilient wheel member hereinafter described, by way of example, having reference to the accompanying drawing, wherein.

Similar characters of reference indicate similar parts in the several figures of the drawing.

Figures 1, 2:
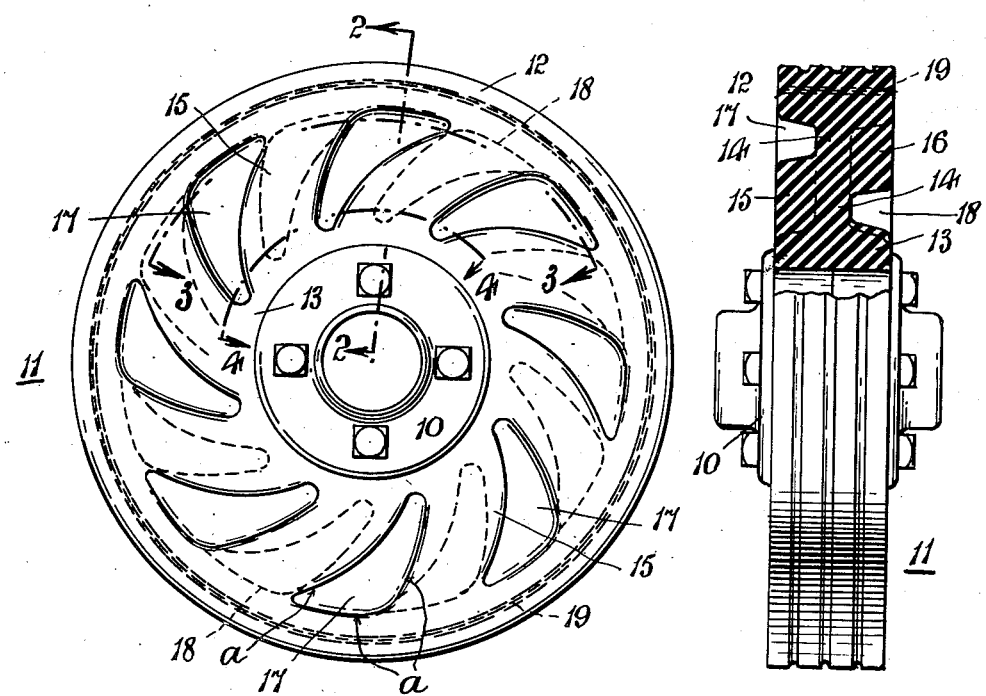
Figure 1 is an elevation of a wheelbarrow or similar wheel embodying the said invention.
Figure 2 is a sectional end elevation of the same with the section taken on a plane indicated by the line 2—2 in Figure 1.

10 indicates the hub of a wheelbarrow wheel, and 11 indicates, in general, an annulus or tire of a resilient material such as is commonly associated with tires intended to have resilient or cushioning characteristics. Such material may be natural or synthetic rubber or rubber-like compound of a suitable strength and degree of resiliency for the purposes, and such materials are readily available and well known in the art to which the invention appertains and do not call for detailed specification herein.

The resilient member or annulus 11 comprises the outer peripheral tread portion 12 and the inner annular hub portion 13 connected by an integral disk or web 14 on either side of which is a circular series of spokes 15 and 16 also integral of the said web 14 and the portions 12 and 13 of the member. Thus the arrangement may be simply a one-piece molded structure, or it may be a built-up structure of a resilient material cemented or fused together to provide an integral unit.

An important feature of the device is that the spokes 15 and 16 are of an arcuate nature, each struck about a center so positioned in relation to the axis of the device that the outer ends of these spokes merge into the peripheral tread portion of the member at a substantial tangent or at an acute angle thereto, whilst the inner ends of the said spokes branch out from the hub portion 13 of the member in a substantially radial manner, as clearly seen in Figure 1 of the drawing.

It is desirable that the width of the spokes, as viewed in side elevation, be maintained more or less constant throughout their length so that the recesses 17 and 18 between the said spokes on opposite faces of the wheel are tapered toward their inner or hub ends so that they are of a triangular configuration as so viewed, although the radial legs of the triangles are arcuate as shown. Thus the width of the spokes 15 and 16 are substantially the width throughout their length of the outer ends of the recesses 17 and 18.

Figure 3:
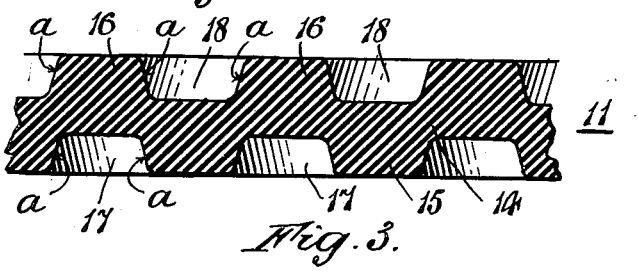
Figure 3 is a developed detail section through the resilient wheel member taken on an arcuate plane indicated by the line 3—3 in Figure 1.

The side walls of these recesses 17 and 18 are beveled, as clearly shown in Figure 3, so that they flare outwardly whereby, upon flection or distortion of the wheel member in use, dirt or foreign matter which may have accumulated in the recesses will be urged outwardly therefrom and thus not interfere with the desired action of the resilient member 11.

Figure 4:
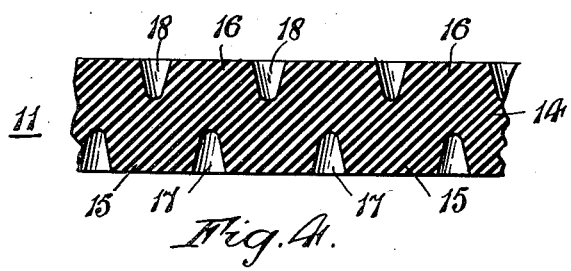
Figure 4 is a similar developed sectional detail taken on an arcuate plane indicated by the line 4—4 in Figure 1.

It is further proposed to arrange the spokes 15 of one side of the member in rotationally staggered relation to the spokes 16 in the opposite side thereof, whereby the spacing between the spokes on one side of the member will be coincident with the positioning of the spokes on the opposite side of the said member, as indicated by the dotted lines in Figure 1 of the drawing and as shown clearly in the sections Figures 3 and 4.

From the said sections Figures 3 and 4 it will be readily observed that the percentage of solid rubber or resilient material to the recess area increases as the hub is approached, with a consequent graduated increase in the resistance of the material of the member to distortion with the depth of such distortion inwardly of the tread of the device; and it will also be observed that such distortion and the forces producing the distortion are directed at an angle to the outer ends of the said spokes 15 and 16, resulting in bending stresses being applied to the said spokes, and a highly desirable and efficient spring action is thus imparted to the tread portion of the member.

The arcuate arrangement of spokes and the staggered arrangement thereof on opposite sides of the member result in stress distributions and resulting mechanical actions of flexing and recovering which absorb shock and cause the member to adapt itself to the condition on the surface over which it may be rolled while, at the same time, maintaining strength against undue distortion radially and against lateral distortion about the hub portion thereof.

The numeral 19 simply indicates a layer or layers of reinforcing material, such as cord or canvas, which may be incorporated in the structure if desired.

This invention may be developed within the scope of the following claims without departing from the essential features of the said invention, and it is desired that the specification and drawing be read as being merely illustrative of a practical embodiment of the same and not in a strictly limiting sense.

What I claim is:

1. A solid rubber wheel comprising an annulus, said annulus defining a central opening for the reception of a hub and being arcuately recessed on both sides to provide a circular series of spokes of a width throughout their length substantially that of the width of the outer ends of said arcuate recesses, the outer ends of which spokes are spaced from and substantially concentric with the outer peripheral portion of the annulus and the inner ends substantially radial of the inner portion of said annulus, the recesses on opposite sides being of a depth less than one-half the thickness between the annulus faces and of a decreasing width inwardly less than the corresponding width of the spokes.

2. A solid rubber wheel comprising an annulus, said annulus defining a central opening for the reception of a hub and being arcuately recessed on both sides to provide a circular series of spokes of a width throughout their length substantially that of the width of the outer ends of said arcuate recesses, the outer ends of which spokes are spaced from and substantially concentric with the outer peripheral portion of the annulus and the inner ends substantially radial of the inner portion of said annulus, the recesses on opposite sides being of a depth less than one-half the thickness between the annulus faces, the spokes on one side of said annulus being rotationally staggered in relation to the spokes on the opposite side with the recesses being of less width than the spokes and being respectively transversely aligned with the spokes at opposite sides.

SELDEN L. SIMPSON.

REFERENCES CITED

The following references are of record in the file of this patent:

UNITED STATES PATENTS

| Number | Name | Date |
| --- | --- | --- |
| 189,318 | McGowan | Apr. 10, 1877 |
| 1,457,013 | Wilson | May 29, 1923 |
| 1,878,330 | Sauer | Sept. 20, 1932 |

FOREIGN PATENTS

| Number | Country | Date |
| --- | --- | --- |
| 435,085 | Great Britain | Sept. 13, 1935 |
| 458,458 | France | May 27, 1913 |